(12) United States Patent  
Stieglbauer et al.

(10) Patent No.: US 7,518,083 B2  
(45) Date of Patent: Apr. 14, 2009

(54) SPOT-WELDING TOOL

(75) Inventors: Walter Stieglbauer, Manning (AT); Manfred Wimmer, Wels (AT); Karin Himmelbauer, Linz (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 11/700,589

(22) Filed: Jan. 31, 2007

(65) Prior Publication Data

US 2007/0158337 A1 Jul. 12, 2007

Related U.S. Application Data

(62) Division of application No. 10/519,873, filed as application No. PCT/AT03/00150 on May 26, 2003, now Pat. No. 7,473,865.

(30) Foreign Application Priority Data

Jul. 3, 2002 (AT) ............... A 996/2002

(51) Int. Cl.
*B23K 11/11* (2006.01)
*B23K 11/30* (2006.01)

(52) U.S. Cl. ........................ 219/90; 219/119
(58) Field of Classification Search ........ 219/86.1, 219/90, 119
See application file for complete search history.

(56) References Cited

U.S. PATENT DOCUMENTS

| 1,094,141 | A | 4/1914 | Gnuchtel | 219/92 |
|---|---|---|---|---|
| 2,356,049 | A | 8/1944 | Goodwin | 219/92 |
| 5,552,573 | A | 9/1996 | Okita et al. | 219/118 |
| 5,961,854 | A * | 10/1999 | Mueller et al. | 219/119 |
| 5,973,287 | A | 10/1999 | Takano | 219/56 |
| 2003/0183602 | A1 | 10/2003 | Hughes | 219/92 |
| 2006/0131281 | A1 | 6/2006 | Stieglbauer et al. | 219/119 |

FOREIGN PATENT DOCUMENTS

| BE | 839 697 A | | 7/1976 |
|---|---|---|---|
| CH | 466 451 | * | 12/1968 |
| CH | 466 451 A | | 12/1968 |
| DE | 1 565 782 | * | 3/1970 |
| DE | 15 65 782 A | | 3/1970 |
| DE | 197 54 546 C1 | | 6/1999 |
| JP | 04 322 886 A | | 11/1992 |
| JP | 05 192 774 A | | 8/1993 |
| JP | 06 344149 | | 12/1994 |
| JP | 08 118 037 A | | 5/1996 |
| JP | 8-118037 | * | 5/1996 |
| JP | 10-29071 | * | 2/1998 |
| JP | 10 029071 A | | 2/1998 |

OTHER PUBLICATIONS

International Search Report.

* cited by examiner

*Primary Examiner*—Kevin P Kerns
(74) *Attorney, Agent, or Firm*—Collard & Roe, P.C.

(57) ABSTRACT

A spot-welding tool having at least one electrode for resistance welding of workpieces such as metal sheets. The spot welding tool has a pressure element for holding down the workpieces arranged on the electrode in a region of the electrode cap to prevent process-dependent warping or arching of the workpiece.

7 Claims, 3 Drawing Sheets

SPOT-WELDING TOOL

CROSS-REFERENCE TO RELATED APPLICATIONS

This is a divisional of U.S. patent application Ser. No. 10/519,873, filed on Dec. 30, 2004 now U.S. Pat. No. 7,473,865, which claims priority under 35 USC 365 of PCT/AT2003/000150, filed on May 26, 2003. Applicants also claim priority under 35 U.S.C. §119 of Austrian Application No. A 996/2002 filed Jul. 3, 2002. The international application under PCT article 21 (2) was not published in English.

BACKGROUND OF THE INVENTION

1. Field of the Invention

The invention relates to a device for the protection of an electrode during the resistance welding of workpieces, particularly metal sheets, including a strip placed over the electrode, preferably in a manner displaceable relative to the same, as well as a spot-welding tool for the resistance-welding of workpieces, particularly metal sheets, including at least one electrode as well as an optional winding mechanism for winding and unwinding a strip for the protection of said at least one electrode. Furthermore, the invention relates to a resistance-welding method by which two workpieces, particularly metal sheets, are welded with each other by the aid of spot-welding tools, wherein at least two electrodes are pressed against each other and powered with energy with the workpieces, particularly metal sheets, being interposed.

2. The Prior Art

At present, metal sheets or other workpieces made of aluminum alloys and magnesium as well as galvanized or coated steel sheets—partially in high-strength quality—are used to an increasing extent, for instance, in body-making. Apart from advantages like weight saving and good corrosion resistance, these materials or their coatings cause problems during joining by spot-welding. Above all, the tool life quantity of the spot-welding electrodes employed, which is strongly reduced as compared to that of blank steel sheets, has adverse effects. The high wear of the electrodes involves high costs due to the frequent reworking of the electrode contact surfaces and the frequent electrode exchanges resulting therefrom as well as a reduced welding quality, particularly prior to an electrode reworking process or prior to an electrode exchange.

For the protection of spot-welding electrodes from contamination or an electrode pick-up by the workpiece to be welded, it is known to insert a metal film in strip-form between the electrode and the workpiece. In order to ensure safe strip feeding, it is in fact necessary to prevent any adherence of the strip to the electrode contact surface.

In this respect, a device for the protection of electrodes during spot-welding is known from EP 0 830 915 B1, in which a strip is drawn by the aid of an unwinding mechanism over the electrode to be protected. The strip consists essentially of a copper-nickel alloy, or pure nickel, and has a thickness of 0.02 to 0.05 mm. In order to ensure an extended tool life quantity, the electrode and, in particular, the electrode cap is coated with silver, or a silver metal-oxide, or provided with an appropriate insert.

Furthermore, a strip for the protection of an electrode in a resistance-welding method is known from U.S. Pat. No. 5,552,573, in which the strip is comprised of a base material to which one layer is each applied on either side, wherein the layers may be made of the same or different materials. The base material has a thickness of 0.02 to 1 mm and is comprised of iron, steel, copper or a copper alloy. The layers applied have thicknesses ranging from 1 µm to 100 µm and may be comprised of nickel, titanium, niobium, molybdenum, tungsten, chromium, cobalt or alloys thereof. Such strips have the drawback of involving extremely high production expenditures due to coating or alloying, which lead to extremely high costs in the production of such strips.

Another very important disadvantage resides in the fact that a plurality of combinations of the most different materials may be envisaged such that a demanding and expensive storage of such combination strips for the most different applications is necessary, because the user has no way to compose the different combinations on his own.

An application of strips for the protection of electrodes in spot-welding methods are further known from DE 197 54 546 C1, JP 10 029 071 A, JP 08 118 037 A, JP 04 322 886 A or JP 05 192 774 A. There, the strip, which is supplied and discharged via a winding mechanism, is positioned in the spot-welding tools above the electrode as a protection means against contacting of the electrode and the workpiece or structural component, so that the strip will come to lie on the workpiece or structural component in a spot-welding process.

In the methods according to DE 197 54 546 C1 and JP 04 322 886 A, it is disadvantageous that the strip is drawn over the electrode during conveyance, thus causing a high electrode wear on account of the friction occurring between the electrode and the strip.

The methods according to JP 10 029 071 A and JP 08 118 037 A involve the disadvantage that a highly complex structure is required for the conveyance of the strip and, in particular, its supply and discharge, so that spot-welding tools of this kind are hardly usable in practice. It is only feasible by such apparatus to weld simple metal sheets. An application in spot-welding robots, particularly for the automotive industry, is, however, impossible, because this would require small, compact spot-welding tools.

SUMMARY OF THE INVENTION

The invention is based on the object to provide a device for the protection of an electrode as well as a spot-welding tool of the initially defined kind, by which the wear of the electrode is strongly reduced. Another object of the invention consists in providing a high-quality welding joint and obtaining a positive adjacency of the workpieces to be welded, particularly metal sheets.

The object of the invention is solved in that the strip is comprised of at least two superimposed metal strips made of different materials. By selecting a suitable material combination, the optimum protection will be obtained for the respective welding, thus strongly reducing the wear of the electrode.

In doing so, it is advantageous that the material of the metal strip facing the electrode during operation is matched to the material of the electrode and the material of the metal strip facing the workpiece, particularly metal sheet, during operation is matched to the material of the workpiece, particularly metal sheet, in terms of predetermined properties. The user may, thus, readily perform an adaptation of the materials of the electrode protection strip to the respectively associated material of the electrode and the workpiece, respectively. This very simple solution allows for a plurality of combinations of different strips to be realized by the user himself at extremely low storage expenditures, while obtaining an optimum welding quality. The user himself may select any strip combination by simply combining two strips of different materials, and he can use the same at once and rapidly carry out any adaptation.

This material match may, for instance, be realized in that the material of the metal strip facing the electrode exhibits little tendency to adhering to the material of the electrode, and the material of the metal strip facing the workpiece exhibits little tendency to adhering to the material of the workpiece. Any adherence of the electrode to the protection strip, and of the protection strip to the workpiece, will thus be effectively prevented.

Another optimization will be feasible, if the material of the metal strip facing the electrode is selected from the group of ferrous metals, or an alloy having its main component selected from the group of ferrous metals, and the material of the metal strip facing the workpiece to be welded, particularly metal sheet, is made of copper or a copper alloy.

According to a further characteristic feature of the invention, it is provided that the material of the metal strip and, in particular, of the metal strip facing the electrode has a melting temperature of above 1000° C. and/or a conductivity of above $1 \text{ m}/(\Omega*\text{mm}^2)$.

In order to enable a simple combination of the protection strip comprised of at least two superimposed metal strips, and also ensure the displaceability of the metal strips relative to each other, it is provided that the metal strips of the electrode protection strip are exclusively positively connected with each other, without forming an integral joint.

The individual metal strips can be connected by rabbeting, gluing, stamping or welding. The type of connection is selected as a function of the respective application. By providing also an integral joint such as, e.g., by gluing or welding, any mutual displacement of the metal strips will be prevented. This may be of advantage for various applications and, in addition, will facilitate the conveyance and guidance of the strip.

According to a simple embodiment of the invention, the metal strips are superimposed in a congruent manner.

For particular applications, it may be advantageous that the metal strips are arranged so as to be displaceable relative to each other. The displacement of the metal strips may be effected in different directions or in the same direction at different speeds.

Furthermore, the object of the invention is also achieved by a spot-welding tool for the resistance welding of workpieces, particularly metal sheets, including at least one electrode, in which a pressure element for holding down the workpieces, particularly metal sheets, is arranged on the electrode in the region of the electrode cap to prevent, in particular, process-dependent warping or arching of the workpieces, particularly metal sheets. By the arrangement of the pressure element, an additional pressure is exerted on the workpieces, particularly metal sheets, so as to cause not only a punctual application of pressure on the workpiece via the electrode and hence prevent the workpiece from arching. In addition, the electrode will, thus, be spared and its wear reduced.

The object of the invention is, however, also achieved by a spot-welding tool for the resistance-welding of workpieces, particularly metal sheets, including at least one electrode and a winding mechanism for winding and unwinding a strip for the protection of said at least one electrode, in which a pressure element is arranged on the electrode in the region of the electrode cap, which pressure element includes a guide for the electrode protection strip and is connected with the electrode in a manner movable in the longitudinal direction thereof so as to place the strip in a spaced-apart relationship to the electrode. By lifting the electrode protection strip from the electrode, the former will no longer slide along the electrode during further movement, which helps to reduce the wear of the electrode. It has thereby become possible to do without expensive coatings on the electrode, and also on the electrode protection strip. A very compact spot-welding tool has thus been created, which can also be applied in welding robots and even manually operated welding tongs. The accessibility of such spot-welding devices including strips corresponds to the accessibility of spot-welding tools having no strips.

It is advantageous if the pressure element projects beyond the electrode in the state of relief, i.e., with the welding tongs opened. Thus, it will always be safeguarded that the strip for the protection of the electrode will not contact the electrode during conveyance.

In an advantageous manner, means for the application of force on the pressure element are provided such that the pressure element exerts a pressure or force on the workpieces, particularly metal sheets, during operation of the spot-welding tool. Thus, no punctual application of force via the electrode but an application of force on several points or areas takes place, by which bending or arching of the workpieces is avoided. And this produces the positive adjacency of the workpieces, particularly metal sheets, during the welding procedure.

The means for the application of force may be comprised of an elastic element such as, for instance, a spring or an adjustment means.

Furthermore, means for the adjustment of the force exerted on the pressure element may be provided so as to enable the optimum adaptation of the spot-welding tool to the respective requirements.

If a supporting element is arranged on the electrode, which preferably includes guide channels for the reception of the strip, the optimum guidance of the strip along the spot-welding tool will be ensured while the structural dimensions of the spot-welding tool including the supply and discharge of the strip can be kept very small.

If the guide of the strip within the pressure element is configured such that the strip for the protection of the electrodes projects beyond an end face of the pressure element, it will be ensured that only the strip will come to rest on the workpiece during pressing at the workpieces while avoiding any adherence to the workpiece, since the material of the metal strip contacting the workpiece is adapted to the same.

According to a further characteristic feature of the invention, the pressure element may be designed in the form of a metal ring which, in an advantageous manner, has a lower electric conductivity than the electrode, or is arranged in an insulated manner, so that the electric current required for welding will not flow over the pressure element.

In order to enable the optimum control of the welding procedure, the pressure element may be designed as a sensor for the detection of the contact of the spot-welding tool with the workpiece, particular metal sheet.

The object of the invention is also achieved by a resistance-welding method by which two workpieces, particularly metal sheets, are welded with each other using a spot-welding tool, wherein at least two electrodes are pressed against each other and powered with energy with the workpieces, particularly metal sheets, being interposed, and wherein the contact of the spot-welding tool with the workpiece is detected by an element, particularly pressure element, movably arranged on an electrode and projecting beyond the electrode and, as such contact is detected, the element is being displaced relative to the electrode until the electrode contacts the workpiece. It is ensured by these method steps that the spot-welding tool can be moved to the workpiece without entailing the risk of an electrode wear and is moved to the workpiece only a slight distance in front of the workpiece.

In doing so, the detection of the contact of the element, particularly pressure element, with the workpiece can be realized using electric energy, by powering with electric energy the element or a strip for the protection of the electrodes guided therein.

Alternatively, the detection of the contact of the element with the workpiece can also be effected mechanically, for instance, by the aid of a switch arranged on said element.

BRIEF DESCRIPTION OF THE DRAWINGS

In the following, the invention will be explained in more detail by way of exemplary embodiments.

DETAILED DESCRIPTION OF THE EMBODIMENTS

Figure 1:
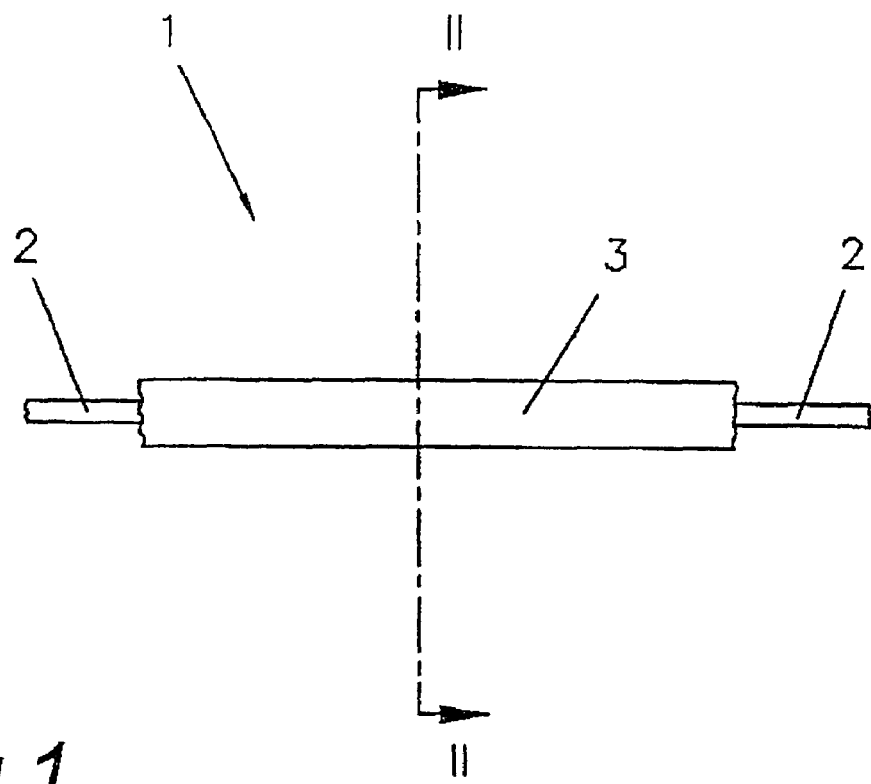
FIG. 1 shows a device for the protection of electrodes in a simplified, schematic illustration.
Figure 2:
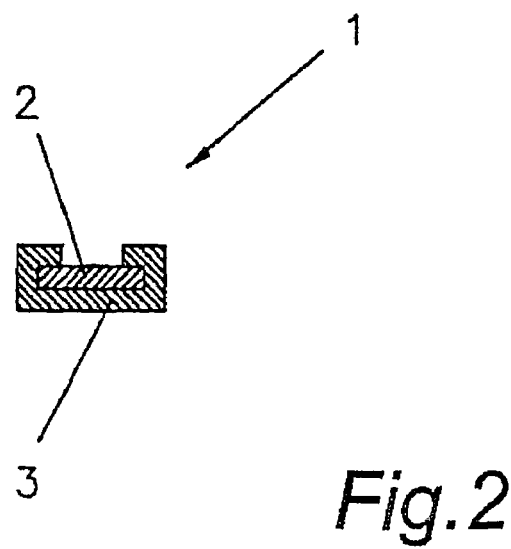
FIG. 2 is a section through the protection device according to FIG. 1 along sectional line II-II.

A strip 1 for the protection of electrodes during resistance-welding is illustrated in FIGS. 1 and 2.

The electrode-protection device employed comprises a strip 1 formed by at least two superimposed metal strips 2, 3 made of different materials. The metal strips 2, 3 are preferably connected in an exclusively positive manner without forming an integral joint. The connection of the metal strips 2, 3 may be realized by rabbeting, gluing, stamping or welding. In the exemplary embodiment illustrated, a strip 1 connected by rabbeting is shown. What is essential is that the metal strips 2, 3 for resistance welding are superimposed in a simple manner, since this will enable an adaptation to the neighboring materials of the workpiece and the electrode. It goes without saying that it is also feasible to arrange the metal strips 2,3 in a relatively displaceable manner with the metal strips 2,3 being displaceable at different speeds after a resistance-welding process.

Figure 3:
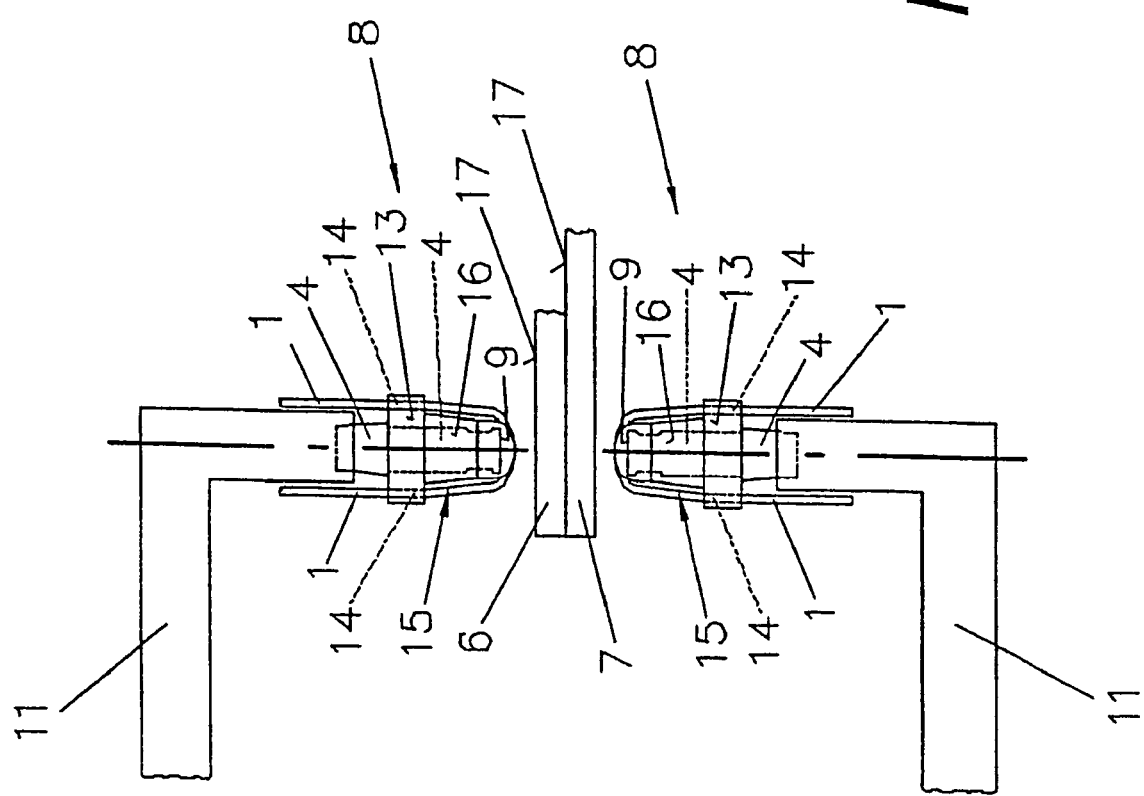
FIG. 3 is a schematic side view of an embodiment of a spot-welding tool.

Such strips 1 for the protection of electrodes 4 in practice are arranged between the electrode 4, particularly an electrode cap 5, and the surface of the workpieces to be welded, particularly metal sheets 6, 7, so as to be displaceable relative to the electrode 4, as is schematically illustrated in FIG. 3. In order to facilitate the guidance and handling of the strip 1, it is suitable to connect the metal strips 2 and 3 with each other. As already pointed out, there are basically several options to do that. The variant most suitable from technological and economical aspects is a mechanical connection of the metal strips 2, 3, for instance, by rabbeting. In this case, preferably the softer one of the at least two materials is rabbeted around the lateral edges of the harder metal strip 2, as is apparent from FIG. 2. By such a non-integral joint of the metal strips 2, 3, the electrode protection strip will be prevented from deforming in an undesired manner despite the different expansion coefficients of the different materials, which will consequently avoid problems in terms of strip guidance. Depending on the respective application of the invention and the materials to be welded, or the materials used for the metal strips 2, 3, it is feasible to set several welding spots on one and the same portion of the band 1 before the latter has to be moved on.

The strip 1 enables the metal strip 2 facing the electrode 4 to be tuned to the electrode material, and the metal strip 3 facing the workpiece, particularly metal sheet 6 or 7, to be tuned to the material of the workpiece, particularly metal sheet 6 or 7, to be welded. It is thereby possible to substantially enhance the welding quality and/or substantially extend the service lives of the electrodes 4 at low cost expenditures. Thus, it is, for instance, feasible to make the metal strip 2 facing the electrode 4 of a material having a low tendency to adhering to the material of the electrode 4, and the metal strip 3 facing the workpiece, particularly metal sheet 6, 7, of a material having a low tendency to adhering to the workpiece to be welded. In a preferred manner, the metal strip 2 facing the electrode 4 is comprised of a material selected from the group of ferrous metals, or an alloy having its main component selected from the group of ferrous metals, and the metal strip 3 facing the workpiece to be welded, particularly metal sheet 6, 7, is made of copper or a copper alloy.

When using a standard electrode 4 of copper or a copper alloy and a coated high-strength steel sheet, it has turned out to be advantageous that the steel sheet is, for instance, used on the side facing the electrode 4. The thickness of the metal strip 2 should preferably range between 0.05 mm and 0.15 mm. The high strength of the metal strip 2 of steel sheet will safeguard reliable conveyance. The metal strip 3 facing the workpiece to be welded, particularly metal sheet 6, 7, may, for instance, be made of pure copper. The thickness of the metal strip 3 is a function of the material and the material thickness of the workpiece to be welded, particularly metal sheet 6, 7, or of the welding parameters such as, for instance, current height or heat introduction, and should preferably range between 0.1 mm and 0.5 mm. During the resistance-welding of workpieces, particularly metal sheets 6, 7, comprising coatings, such as, for instance, special workpieces with zinc layers optionally containing inorganic matter, there is a tendency of copper to enter into a chemical reaction with the coating. The use of a metal strip 3 of copper is, thus, highly beneficial to such metal sheets, since it will guarantee clean and splash-free resistance-welding.

The most essential advantage in a resistance-welding process of this kind, using a strip 1 for the protection of the electrode 4 resides in that the strip 1 can be adapted to the various parameters that are essential to the resistance-welding process. In doing so, the materials of the superimposed metal strips 2, 3 are tuned to each other in a manner that it will, for instance, be possible to ensure a desired introduction of heat, which will influence the welding quality. It is, moreover, possible that the strip 1, particularly the metal strip 2 facing the electrode 4, has a melting temperature higher than 1000° C., or a conductivity higher than $1 \text{ m}/(\Omega*\text{mm}^2)$, so as to prevent the strip 1 from adhering to the electrode 4. By suitably varying the two metal strips 2, 3 in terms of material and thickness, the thermal economy of the welding process will be substantially influenced and improved.

A particular advantage of such a strip 1 also resides, above all, in that, due to the non-integral joint of the metal strips 2, 3, i.e., the use of two independent metal strips 2, 3, the user will be able to produce such strips 1 by himself, thus providing optimum material combinations for the welding process envisaged.

Figure 4:
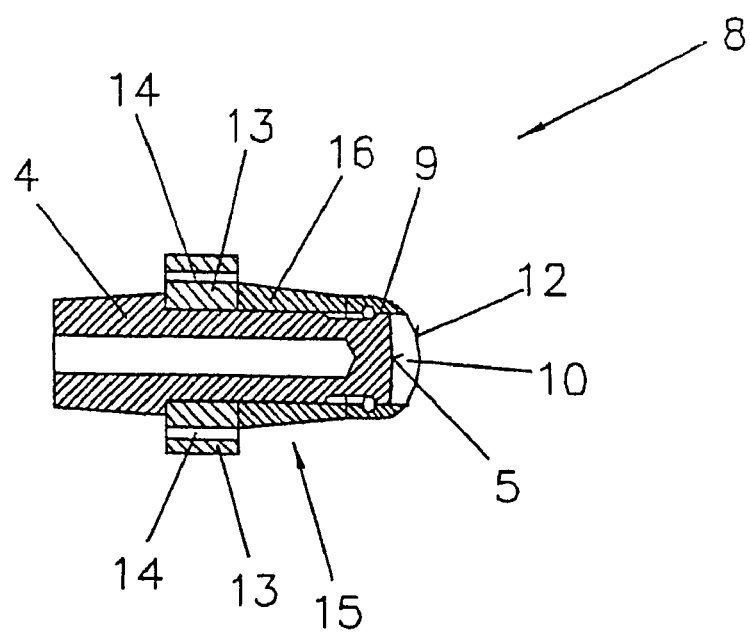
FIG. 4 shows a section through an embodiment of a spot-welding tool in a simplified, schematic illustration.
Figure 5:
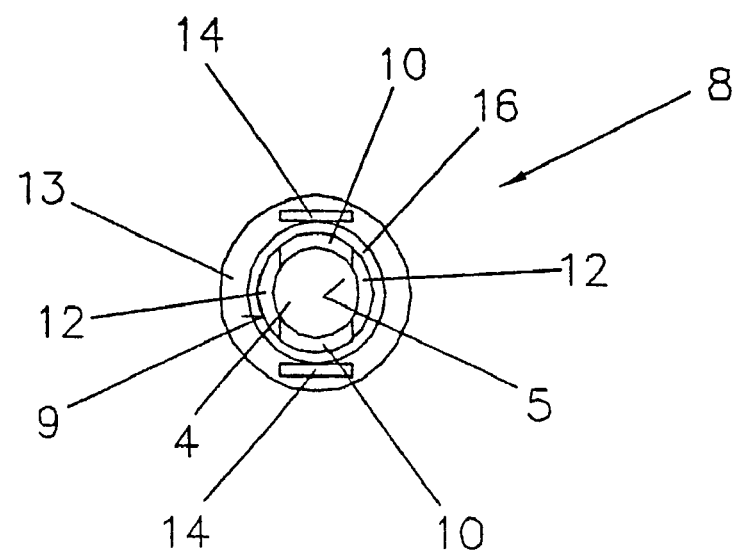
FIG. 5 is a view on the spot-welding tool according to FIG. 4 from the side of the workpiece.

FIGS. 3 to 5 depict a spot-welding tool 8 for the resistance-welding of metal sheets 6, 7 or structural components. In a preferred manner, the spot-welding tool 8 is used in combination with a winding mechanism (not illustrated) for winding and unwinding a strip 1 transversely contacting an electrode 4, preferably using a strip 1 as described by way of FIGS. 1 and 2. It is, however, also possible to use with the welding tool 8 according to the invention only a one-piece strip 1 optionally including an alloyed-on layer, as known from the prior art.

A pressure element 9 is arranged about the electrode 4 in the region of the electrode cap 5, or area of contact of the electrode 4 with the workpiece, particularly metal sheet 6, 7. The pressure element 9 is movably arranged on the electrode 4 and exerts additional pressure on the workpiece. If the spot-welding tool 8 including the strip 1 is used, the pressure element 9 will preferably comprise a guide 10 for the strip 1, particularly on its end face, wherein the pressure element 9 is configured to lift the strip 1 off the electrode 4 in a manner that the strip 1 is lifted from the electrode surface or electrode cap 5 by the pressure element 9 during or after the opening of welding tongs 11 as schematically indicated in FIG. 3, or a functionally similar apparatus. The guide 10 provided in the pressure element 9 is designed such that the strip 1 terminates level with an end face 12 of the pressure element 9. The guide provided in the pressure element 9 for the strip 1 may, of course, also be designed such that the strip 1 projects beyond the end face 12 of the pressure element 9.

In the exemplary embodiment illustrated, the spot-welding tool 8 is comprised of an annular structure, wherein the pressure element 9 is comprised of a metal ring having a lower electric conductivity than the electrode 4. The pressure element 9 is arranged on the cylindrical electrode 4 in an axially displaceable manner. In the state of relief, i.e., with the welding tongs 11 opened, the pressure element 9 projects beyond the electrode 4. Furthermore, a supporting element 13 comprising guide channels 14 for the reception of the strip 1 may be arranged on the electrode 4. A means 15 for the application of force on the pressure element, particularly a spring member, may be arranged between the supporting element 13 and the pressure element 9, thus enabling a suitable pressure to be exerted on the pressure element 9 so as to displace the same along the electrode 4.

In the example illustrated, the pressure element 9, or strip guide, is pressed forward by an elastomer spring 16. Naturally, the pressure element 9 can also be actuated in another way, e.g., pneumatically, hydraulically or electrically. The pressure element 9 will, thus, exert a high pressure or force on the workpiece, particularly metal sheet 6, 7, if it is pressed against the workpiece, particularly metal sheet 6, 7, upon actuation of the welding tongs 11. As the welding tongs 11 are closed, the pressure element 9 is being pressed backward after having touched the workpiece, particularly metal sheet 6, 7, until the electrode 4, particularly the electrode cap 5, gets into contact with the sheet-metal surface 17 of the workpiece. As the tongs 11 are opened, the pressure element 9 is being pressed forward by the means 15 for the application of force, particularly elastomer spring 16 or other actuating means. Because of the deliberately produced tensile stress and the unavoidable stiffness of the strip 1, it is forcibly placed in a spaced-apart relationship to the electrode surface and, in particular, electrode cap 5.

The pressure element 9, during the welding process, thus partially exerts a pressure on the sheet-metal surface 17 lying close to the welding zone and thereby prevents the two workpieces, particularly metal sheets 6, 7 from opening, which usually happens in spot-welding processes. The reason why this happens in resistance-welding methods known from the prior art is that heat and a punctual pressure are applied on the workpieces, particularly metal sheets 6, 7, via the electrodes 4 during the welding process, which lead to local expansions of the workpieces to be welded, particularly metal sheets 6, 7, thus causing spot-welded workpieces, particularly metal sheets 6, 7, to exhibit a tendency to distortion/deformation, i.e., causing the metal sheets 6, 7 to move away from each other or bend up and form a gap between them. This is prevented by the special design of the spot-welding tool 8 according to the invention, since an accordingly high pressure is exerted on the surfaces 17 of the metal sheets 6, 7 not only by the electrode 4, but also by the pressure element 9, whereby unfavorable effects will be avoided in a simple manner.

On account of the additional force applied by the pressure element 9 on the workpiece, or metal sheet 6, 7, it is thus ensured that the process-dependent bending or warping of the metal sheets 6, 7 will be prevented because of an appropriate pressure being simultaneously exerted on the workpiece, or metal sheet 6, 7, by the electrode 4 and the pressure element 9. With the appropriate configuration of the force application means 15, it is, of course, possible to adjust the pressure or force applied by the pressure element 9 on the workpiece, particularly metal sheet 6, 7.

During or upon lifting of the electrode 4 from the workpiece, particularly metal sheet 6, 7, the optional strip 1 is forcibly lifted off the spot-welding electrode 8, preferably mechanically by the force application means 15. This helps to reduce the force required for moving on the strip 1 and avoid subsequent tearing of the strip. Thereby, the reliability of the device and welding process, respectively, will be guaranteed. In this respect, it has turned out to be of great advantage to lift the strip 1 off the electrode surface or electrode cap 5 after every welding spot. Hence result several advantages. Since the strip 1 is lifted prior to its displacement, the electrode 4 will be spared accordingly and not worn by the strip 1 drawn over it. The electrode 4 will, thus, keep its form over an extended period of time, and any adherence of the strip 1 to the electrode 4 will be prevented even if the same strip portion is welded several times. Thus, the reliability of the entire apparatus and welding process, respectively, is strongly enhanced, since strip tears are avoided, particularly by the reduced friction and the reduced transport power required. The same site of the strip 1 can, therefore, be used several times without any risk of the strip 1 adhering to the electrode surface or electrode cap 5, or welding therewith, whereby considerable strip quantities can be saved.

It is, furthermore, feasible to design the pressure element 9 as a sensor for the detection of a contact between the spot-welding tool 8 and the workpiece, particularly metal sheet 6, 7. In this case, the contact with the workpiece is recognized via the pressure element 9. After this, appropriate control cycles can be initiated. In doing so, it is feasible to use the spot-welding tool 8 with or without the strip 1.

To this end, the pressure element 9 is powered with electric energy and, in particular, a voltage potential with the counter potential being applied at the workpiece. If the pressure element 9 contacts the surface of the workpiece, or the surface 17 of the metal sheet, the circuit will be closed. By the appropriate evaluation by the aid of a control means (not illustrated), it can, thus, be recognized that a contact between the pressure element 9 and the workpiece has taken place. The control means will then trigger different method cycles.

The automatic recognition of the pressure element 9 touching the workpiece has rendered feasible the optimization of the closing procedure of the welding tongs 11. It is, for instance, feasible to initially carry out a rapid closing procedure upon activation of the welding tongs 11, until contacting of the workpiece has occurred, whereupon a lower-speed closing procedure just for building up the welding pressure will follow. This has the advantage that no abrupt exertion of force on the workpieces, particularly metal sheets 6, 7, will take place and the risk of a distortion of the metal sheets 6, 7 will be avoided. Also is the closing procedure highly accelerated by such a mode of procedure, since the welding tongs 11 can at first be closed at a high speed, with a slower closing procedure being only started after contacting, whereas the welding tongs 11 in the system known from the prior art are closed at a low speed already from a previously programmed tong position naturally including safety distances, in order to avoid sudden actions of force. An optimized closing procedure is, thus, achieved.

The pressure element 9 can be arranged on the electrode 4 in an insulated manner. This allows for the use of a power circuit separated from the welding power circuit, and the optimum control of the current source not illustrated.

Yet, touching or contacting can also be recognized mechanically, in which case the pressure element 9 is connected with a switching element in a manner that the switching element is activated by a displacement of the pressure element 9, thus initiating control procedures, and the control means is, in turn, able to evaluate the contacting of the surfaces 17 of the workpiece or metal sheet by the activation of the switching element.

What is claimed is:

1. A spot-welding tool for resistance-welding of workpieces, comprising:

two welding tongs;

at least two electrodes, each electrode having a cap and being disposed on a respective one of the welding tongs;

a winding mechanism for winding and unwinding a strip for protection of at least one of said at least two electrodes;

a pressure element arranged on each electrode in a region of the electrode cap, said pressure element including a guide for the strip and being connected with the electrode in a manner movable in a longitudinal direction thereof so as to place the strip in a spaced-apart relationship to the electrode, wherein said pressure element exerts additional pressure on the workpieces when said welding tongs are closed, wherein said pressure element projects beyond the electrode when the welding tongs are in an open position and is automatically displaced relative to the respective electrode and toward the workpieces as the welding tongs are opened, said guide guiding the strip so as to lie parallel to a longitudinal axis of the electrode and said pressure element automatically lifting the strip off of the electrode as the strip is guided during or after the opening of the welding tongs; and a supporting element arranged on each electrode, said supporting element including guide channels for receiving the strip.

2. A spot-welding tool according to claim 1, further comprising means for application of force on the pressure element, such that the pressure element exerts a pressure or force on the workpieces during operation, said means for application of force effecting the automatic displacement of the pressure element relative to the respective electrode as the welding tongs are opened.

3. A spot-welding tool according to claim 2, wherein said means for the application of force is comprised of an elastomer spring.

4. A spot-welding tool according to claim 2, further comprising means for adjustment of the force exerted on the pressure element.

5. A spot-welding tool according to claim 1, wherein the guide for the strip is configured such that the strip projects beyond an end face of the pressure element.

6. A spot-welding tool according to claim 1, wherein the pressure element is designed in the form of a metal ring having a lower electric conductivity than the electrode.

7. A spot-welding tool according to claim 1, wherein the pressure element is designed as a sensor for detecting contact of the spot-welding tool with the workpieces.

* * * * *